Dec. 13, 1927.

A. GEISLER 1,652,777

SLEEPING EYE FOR RUBBER DOLLS

Filed Jan. 8, 1927

INVENTOR
BY August Geisler
ATTORNEY

Patented Dec. 13, 1927.

1,652,777

UNITED STATES PATENT OFFICE.

AUGUST GEISLER, OF LIMBURG-ON-THE-LAHN, GERMANY, ASSIGNOR TO ARRANBEE DOLL COMPANY, A FIRM.

SLEEPING EYE FOR RUBBER DOLLS.

Application filed January 8, 1927. Serial No. 159,964, and in Germany February 16, 1926.

This invention relates generally to movable eyes for dolls, the invention having more particular reference to sleeping eyes for rubber dolls. The invention has for an object the provision of improved eyes of simple construction and of cheap manufacture.

A further object of the invention is the provision of a means of retaining the movable eyes in the rubber head of the said doll.

For further comprehension of the invention and of the objects and advantages thereof, reference will be had to the following description and accompanying drawings, and to the appended claims in which the various novel features of the invention are more particularly set forth.

Fig. 1 of the drawings, is a perspective view of my improved movable doll's eye.

Figure 1:
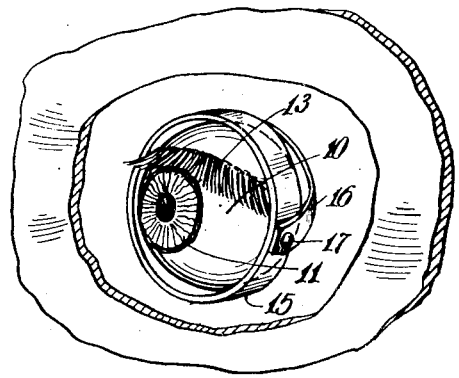
Figure 2:
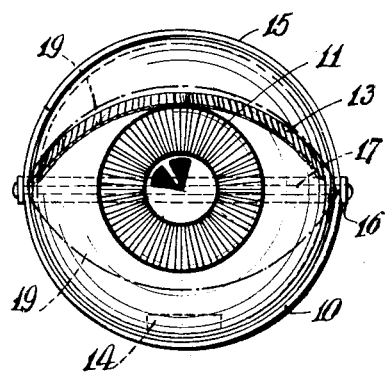
Fig. 2 is an enlarged front elevational view thereof.

As here embodied my improved device comprises an eye 10, of hollow spherical construction, and having affixed thereto, painted, printed, or similarly inscribed thereon, ornamentation in any desired manner, as at 11, so as to represent the pupil of an eye. The eye 10 is open at its rear end, as at 12. The eye lash 13, of any suitable material, is attached to the eye 10, directly above the pupil 11, and is preferably slightly raised therefrom, as clearly shown in Fig. 3 of the accompanying drawings. The counter weight 14, is attached inside the eye 10, and is positioned or located below the pupil 11, adjacent to the said open end 12.

The supporting member 15, preferably of strip metal, or the like, is formed or bent, of ring shaped construction, and is of suitable size, so as to encircle the eye 10, in a vertical direction, and has attached thereto, a secondary supporting member 16, adapted to extend from the center of the said supporting member, so as to encircle the rear portion of the eye 10. The rod 17, is extended through the center of the eye 10, in a horizontal position, and is attached at its extremities to the supporting member 15 and to the secondary supporting member 16, at the common attaching points of the two latter mentioned members.

The above described construction is such as will permit the eye 10 to pivot, swing or roll on the rod 17, it being understood that the rubber head of the doll is provided with a suitable aperture 18, preferably oval shaped, as at 19, at its exterior, and provided with indentations or circumferential recesses to receive the supporting member 15 and the secondary supporting member 16, as a means of holding the eye 10 in the desired relative position in the above referred to doll's head.

It is further understood that the counter weight 14 will hold the eye 10 in an open position when the doll to which same is attached is in an upright position and that the said counter weight will cause the eye 10 to pivotally close when the doll is placed in a reclined or lying down position, which will cause the pupil 11 of the eye to close when the doll is placed in a recumbent position. The movement of the eye 10 being further regulated and controlled by the eye lash 13, which will strike the upper and lower edges of the aperture 18.

Figure 4:
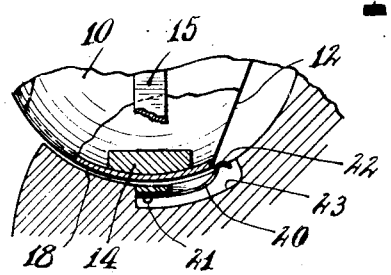
Fig. 4 is a fragmentary side elevational view thereof, partly in section, showing a further development of my improved movable doll's eye.

Referring in particular to Fig. 4 of the accompanying drawings, in which I have added a leaf spring 20, attached at one extremity, as at 21, to the above referred to supporting member 15, the leaf spring 20 has its free extremity, formed or bent, as at 22, so as to engage the open end 12 of the eye 10, so as to cause the eye 10 to remain open until the doll is placed in a recumbent position, at which time the eye 10 will close suddenly. It should be understood that the leaf spring 20 is of suitable tension to retard the closing of the eye 10 until the doll is placed in a substantially reclined position, and that a recess 23 is provided in the rubber doll's head to accommodate the said leaf spring.

The spring 20 is sufficiently strong to resist the effect of the counter weight 14 when the doll is placed in a partially reclined position and the counter weight 14 is of sufficient weight to overpower the spring when the rod is placed in a completely reclined position. This arrangement permits the eyeball to be retained in open position until the doll is completely reclined and thereafter permits the eyeball to more suddenly rotate to closed position.

Figure 3:
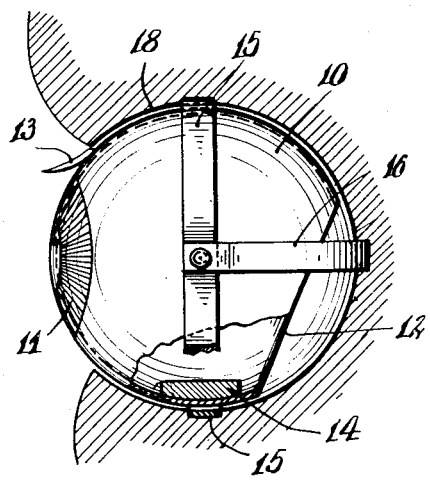
Fig. 3 is a side elevational view thereof, partly fragmentary, so as to expose certain interior parts thereof, illustrating as it would appear when attached to a doll's head.

It should be understood that the eyeball supporting frame comprising the ring member 15 and the semi-ring member 16 are formed to closely fit the curvature of the ball and the socket 18 into which the frame is disposed as shown in Fig. 3. The doll, comprising rubber, is sufficiently flexible to permit insertion of the frame and eyeball into the socket 18 and the circumferential recesses are adapted to receive the frame to resiliently hold the same in a predetermined position within the socket. The frame and eyeball are thus resiliently held in the socket 18 in a manner which permits convenient assembly of the doll and which also permits the frame and eyeball to be readily removed and replaced. This is of advantage in suitably equipping a particular doll with eyes of the color desired by a purchaser and in allowing removal of the eyes when the doll is being cleaned without requiring complete disassembly thereof; it being understood that the frame is resiliently held in the socket and not rigidly attached to the head of the doll.

Having thus described my invention, what I claim as new and desire to protect by Letters Patent of the United States is as follows:

1. A doll of the class described having an eye socket in the head thereof provided with circumferential grooves, a frame removably mounted in said socket comprising a ring member and a semi-ring member attached at its extremities to said ring member, said frame being adapted to recline in said circumferential grooves, a rod mounted on said frame, a substantially spherical member decorated to represent an eyeball rotatively mounted on said rod, and gravity means mounted in said spherical member adapted to rotate the same to closed position when said doll is reclined and to open position when said doll is disposed in upright position.

2. In a rubber doll having eye sockets in the head thereof provided with circumferential grooves, frames comprising a ring member and a semi-ring member attached thereto and disposed in said grooves, said frames being resiliently held in said sockets, and retained in a predetermined position therein by said grooves, a rod mounted on each frame, hollow substantially spherical members rotatively mounted on each of said rods, and a weight disposed in each hollow spherical member adapted to effect rotation thereof when said doll is moved from a vertical to a horizontal position.

3. In a rubber doll having eye sockets in the head thereof provided with circumferential recesses, removable frames disposed in said sockets and resiliently retained in a predetermined position by said grooves, hollow substantially spherical members rotatively mounted on said frames having an open rear portion, said spherical members being decorated to represent an eyeball, weights disposed in said hollow spherical members adapted to effect rotation thereof when said doll is moved to reclined or vertical position, and a spring attached at one end to each of said frames and disposed upwardly at its other end adapted to engage the open edge of said spherical members to retard the rotation thereof to closed position when said doll is being moved from a reclined position, said frames and spherical members being adapted to be removed bodily from and inserted into said sockets in assembled condition.

In testimony whereof I have affixed my signature.

AUGUST GEISLER.